United States Patent
Percival

(10) Patent No.: US 6,808,665 B1
(45) Date of Patent: Oct. 26, 2004

(54) THERMOFORMING PROCESS FOR MASKED POLYMERS

(76) Inventor: Jeffrey D. Percival, 369 Roundtable Dr., Camdenton, MO (US) 65020

(*) Notice: Subject to any disclaimer, the term of this patent is extended or adjusted under 35 U.S.C. 154(b) by 527 days.

(21) Appl. No.: 09/682,194

(22) Filed: Aug. 3, 2001

(51) Int. Cl.⁷ .............................................. B27B 17/00
(52) U.S. Cl. ..................... 264/130; 264/134; 264/241; 264/259; 264/292; 264/320
(58) Field of Search ................................ 264/130, 134, 264/241, 259, 292, 320

(56) References Cited

U.S. PATENT DOCUMENTS

| | | | | |
|---|---|---|---|---|
| 4,148,645 A | * | 4/1979 | Gates | 156/59 |
| 5,066,351 A | * | 11/1991 | Knoll | 156/212 |
| 5,401,456 A | * | 3/1995 | Alesi et al. | 264/511 |

OTHER PUBLICATIONS

Copy of brochure describing PITT–THERM® High Heat & Stress Corrosion Coating.
Material Safety Data Sheet for Gray Pit–Therm (Product UC59571) Coatings and Resins Group, PPG Industries, Inc.
Material Data Sheet for 97–724 Product Coatings and Resins Group, PPG Industries, Inc.
Web printout from U.S. Glass Magazine, Back Issues, 9901, Jan. 1999. From web page www.usglassmag.com/back-issues/9901/9901k98plastics.html.

* cited by examiner

Primary Examiner—Stephen J. Lechert, Jr.
(74) Attorney, Agent, or Firm—Marcia J. Rodgers; Shughart, Thomson & Kilroy, P.C.

(57) ABSTRACT

In a thermoforming system for masked polymer substrate sheets, a temperature resistant, non-stick coating is applied to a sheet of a polymer substrate material. The coated sheet is positioned on a flexible platen positioned over a mold having a predetermined shape. Heat is applied until the polymer reaches a thermoforming temperature and softens, whereupon the platen is lowered to stretch over and cover the mold. When the sheet begins to conform to the mold, the heat is withdrawn and a second platen is lowered over the sheet to urge it into conformance with the mold. The temperature resistant coating can be applied over an existing polymer film masking, and rapidly cures to form a non-stick surface which prevents adhesion of the masked polymer sheet to the platen surfaces.

9 Claims, 4 Drawing Sheets

THERMOFORMING PROCESS FOR MASKED POLYMERS

BACKGROUND OF INVENTION

1. Field of the Invention

The present invention is concerned with a system for thermoforming masked polymer substrates.

2. Description of the Related Art

Transparent and selectively transparent thermoformable polymeric synthetic resin compositions are employed to form a variety of products such as lenses, windows, housings and a wide-variety of containers and coverings. These polymer compositions are particularly well-suited for automotive use because they provide glass-like optical clarity yet are substantially lighter in weight and offer greater crash safety. High polymer thermoplastic compositions such as polycarbonate, present a superior substrate for molded windshields and windows for vehicles of all types, for example, racing cars, motorcycles, all terrain vehicles, automobiles, heavy equipment, boats and aircraft, as well as for skylights and windows used in conventional housing and mobile homes.

The clear polymer substrate is obtained in sheet form and then subjected to a thermoforming process in which the polymer sheet is placed over a mold and heat is applied. As the heated polymer sheet approaches its melting point, it softens and conforms to the shape of the mold. When cooled, the polymer retains its formed shape. Thermoformable polymers are not abrasion resistant. In order to protect against rough handling during shipping and prior to thermoforming, manufacturers generally apply a protective masking to cover the exposed surfaces. Known protective maskings must be removed prior to the thermoforming process to avoid damaging the polymer substrate or fouling the mold.

One method of masking a polymer substrate involves application of a thin layer of a fibrous material, such as paper, to the surfaces. Such masking is difficult to apply and an adhesive composition must be employed to bond the paper to the polymer sheet. Adhesive bonding agents are incompatible with many polymer compositions and may chemically interact with the polymer, altering the surface of the sheet, for example, with pitting or blistering. Adhesive bonding agents may be also be difficult to remove completely from the substrate surface when the masking is removed. After the adhesive is removed a residue may remain on the surface of the polymer sheet. Adhesively bonded protective masking is not suitable for use during thermoforming and must be removed prior to the application of heat to the polymer substrate in order to avoid melting the adhesive into the substrate.

High polymer films such as low density polyethylene are preferred manufacturer-applied maskings for polymer sheet goods because they can be applied to both planar surfaces immediately following extrusion of the sheet. The elevated temperature of the polymer sheet in combination with applied pressure causes the polyethylene film to bind to the surface of the sheet without the need for an adhesive substance. The film is easily and completely removed by hand peeling without the need for solvents or other mechanical action such as scraping, which might damage the surface of the underlying polymer sheet.

However, because the melting point of such branched chain polyethylenes is substantially lower than that of known thermoformable polymer substrates, polyethylene masking achieves a viscous liquid state at the forming temperatures of polymer substrates. Consequently, the masking must be removed prior to subjecting the substrate to a thermoforming process so that it does not foul the mold. Once the protective masking is removed, the surfaces of the polymer sheet are exposed to damage from abrasion and scratching inflicted by the hard surfaces of the mold during thermoforming. In addition, static electricity may cause the unmasked polymer surfaces to become contaminated with dust and grit during thermoforming and incidental handling.

Where optical clarity of the formed article is important, a hardcoat polymer finish is generally applied to the thermoformed article to protect the surface against scratching. Depending on the intended usage of the article, It may be desirable to apply other coatings such as a tints, photochromic, antifog compositions or the like. Since the surfaces have not been continuously masked during the thermoforming process, acquired particulate matter must be completely removed in an additional cleaning step prior to application of any subsequent coating.

Accordingly, there is a need for a system for thermoforming polymer substrates which are masked to protect the surfaces from damage during the molding process, and which provides a quick, clean release of the finished, masked article.

SUMMARY OF INVENTION

The present invention provides a thermoforming system for masked polymer substrates which is energy efficient, minimizes thermoforming temperatures and produces a product with superior optical clarity. A temperature resistant, non-stick coating is applied to a sheet of a thermoformable polymer substrate material. The coated sheet is positioned on a flexible platen positioned over a mold having a predetermined shape. Heat is applied until the polymer reaches a thermoforming temperature and softens, whereupon the platen is lowered to stretch over and cover the mold. When the sheet begins to conform to the mold, the heat is withdrawn and a second platen is lowered over the sheet to urge it into conformance with the mold. The temperature resistant coating can be applied over an existing polymer film masking, and rapidly cures to form a non-stick surface which prevents adhesion of the masked polymer sheet to the platen surfaces.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present Invention in virtually any appropriately detailed structure.

Figure 4:
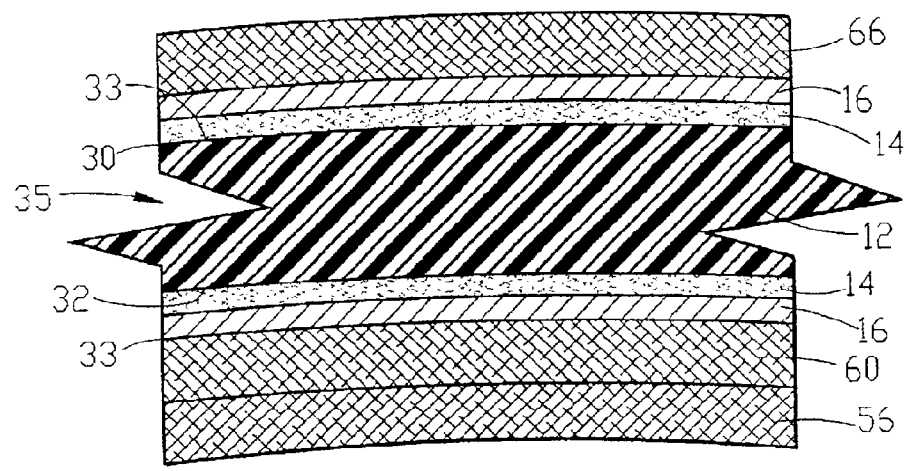
FIG. 4 is a fragmentary sectional view of the coated polymer sheet positioned a pair of platens depicted in FIG. 2.
Figure 6:
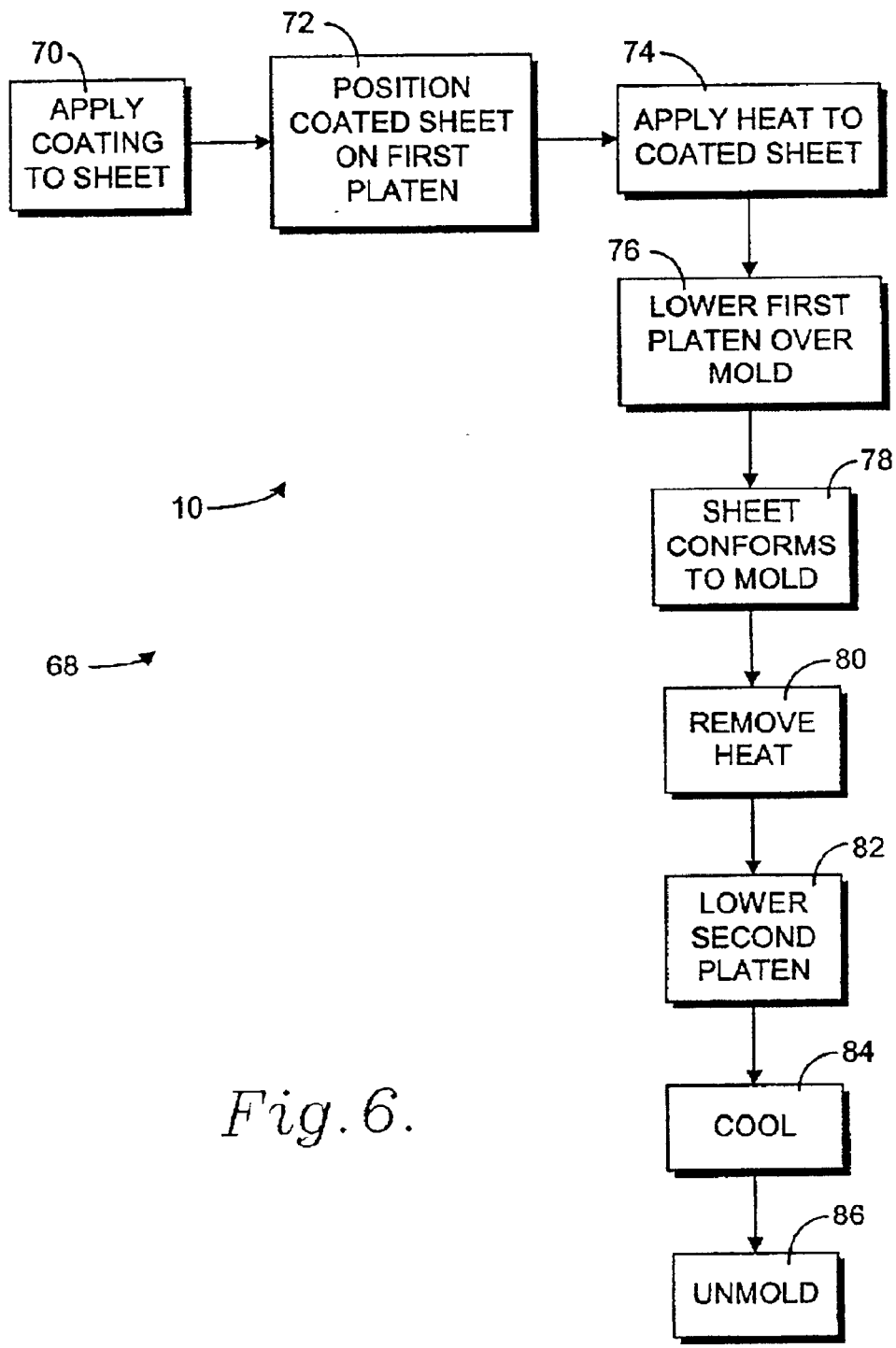
FIG. 6 is a flow diagram showing steps of a thermoforming system for masked polymers in accordance with the invention.

As best shown in FIGS. 4 and 6, the reference number 10 generally designates a thermoforming system for masked polymers in accordance with the invention. The system 10 is designed for use with a thermoformable substrate 12 laminated between layers of a polymer film 14. The system broadly includes a high temperature coating composition 16 and a thermoforming apparatus 18. The thermoforming apparatus 18 includes a support assembly 20 (FIG. 1) supporting a mold 22, first and second web platens 24 and 26 and a radiant heat source 28.

In more detail, the substrate 12 is provided in sheet form, and is composed of a high polymer thermoplastic polymeric resin, such as polycarbonate, polymethylmethacrylate, polyurethane, polyester, polyamide, polyimide, phenolic resin, cellulosic resin, polystyrene, styrene copolymer, epoxy, polyester resin, polyethylene terephthalate or any other suitable thermoplastic polymer. While transparent thermoplastic polymer compositions are preferred in applications where optical clarity Is Important, opaque and selectively transparent polymers may also be employed, for example, for forming vehicle body parts. Preferred Xpolycarbonate substrates are sold under the trademarks LEXAN® by General Electric Structural Products, Mr. Vernon, Ind., and HYZOD® by Sheffield Plastics, Inc., Sheffield, Mass.

The substrate 12 Includes upper and lower surfaces, 30 and 32. The polymer film 14 is laminated to the substrate upper and lower surfaces 30 and 32, preferably by application of the laminate 14 under pressure immediately following production of the substrate sheet 12, while the surfaces 30 and 32 remain at elevated temperature. Lamination of the polymer film 14 is generally performed in a so called "cleanroom" environment, so that no particulate matter is entrapped between the laminate 14 and the substrate surfaces 30 and 32. The laminate 14 is formed of a high polymer composition such as low density polyethylene, polypropylene, polymethylmethacrylate, silicone, polyester, nylon or vinyl, or any other material capable of bonding with the thermoplastic substrate 12 without requiring use of an adhesive.

A heat resistant, non-stick, quick release coating composition 16 is applied over the laminate 14. The coating 16 is provided in liquid form, may be applied by spraying, rolling, brushing, dipping or any other suitable method, and cures quickly to form a tackless, non-stick surface. The preferred liquid coating 16 bonds to the lower melting point polymer laminate 14 so that the laminate 14 and the coating 16 cooperatively form a resilient, heat resistant masking 33 which protects the underlying substrate 12 against damage. This allows the polymer substrate 12 to be thermoformed with the polymer film masking 14 in place. The substrate 12 with heat resistant masking 33 constitutes a laminate workpiece 35.

The coating must be able to withstand thermoforming temperatures of up to at least about 450° F. without ignition or degradation, and it must have non-stick characteristics so that it will not adhere to the surface of the platens 24 and 26.

Effective coating compositions 16 include silanes, silicones, siloxane, acrylic resins, polytetrafluoroethylene, ceramic coatings, epoxies, thermosetting synthetic resins such as polyester, urethane, allyl or amino resins or phenolic resin in combination with an organic solvent. Any of a number of proprietary coating compositions may be employed, such as Black Pitt-Therm or Gray Pitt-Therm, both produced by PPG Architectural Finishes may be employed. The coating has a thickness of about 0.0005 to about 0.005 inches, with a preferred thickness of about 0.002 inches.

The support or frame assembly 20 of the thermoforming apparatus 18 includes a table 34 having a top 36, four sidewalls 38 and a bottom 40 coupled with plurality of ground or track engaging wheels 42. The wheels 42 permit movement of the support assembly 20 with respect to the heat source 28. The top 36 supports a three dimensional mold 22 at a convenient height. A pair of laterally extending housings 44 are coupled with respective opposed sidewalls 38 for mounting respective pairs of support legs 46 for supporting the first platen 24.

Each pair of legs 46 has a scissorlike configuration for permitting extension and retraction and is operably coupled with a respective motor or drive mechanism (not shown) contained within the housing 44. In this manner, as depicted in FIGS. 1 and 2, the first platen 24 is reciprocally movable between a first, raised position and a second, mold-contacting position.

A pair of cylinders 48 are dependently mounted on a ceiling or other support framework or surface (not shown) for supporting the second platen 26. The cylinders 48 are coupled with a hydraulic actuating source and valving (not shown) for permitting extension and retraction causing the second platen 26 to be reciprocally movable between a first, raised position and a second position contacting the first platen 24.

An upstanding frame 50 supports the radiant heat source 28 in spaced relationship to the support assembly 20 and includes structure (not shown) permitting lateral movement of the frame 50 with respect to the support assembly Alternatively, the frame 50 may be constructed to support the second platen 26 as well as the heat source 28. The heat source 28 is constructed to evenly deliver a band of infrared heat.

Figure 1:
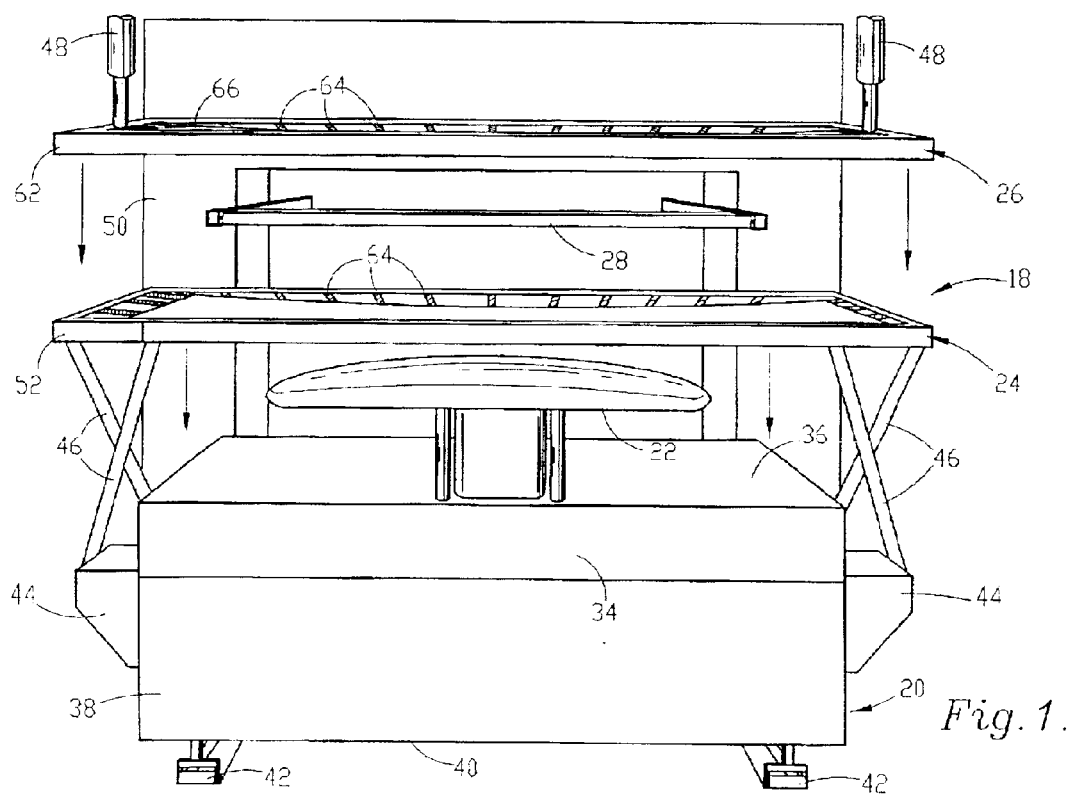
FIG. 1 is a front perspective view of a thermoforming apparatus in accordance with the present invention in an open, polymer sheet-receiving position.
Figure 2:
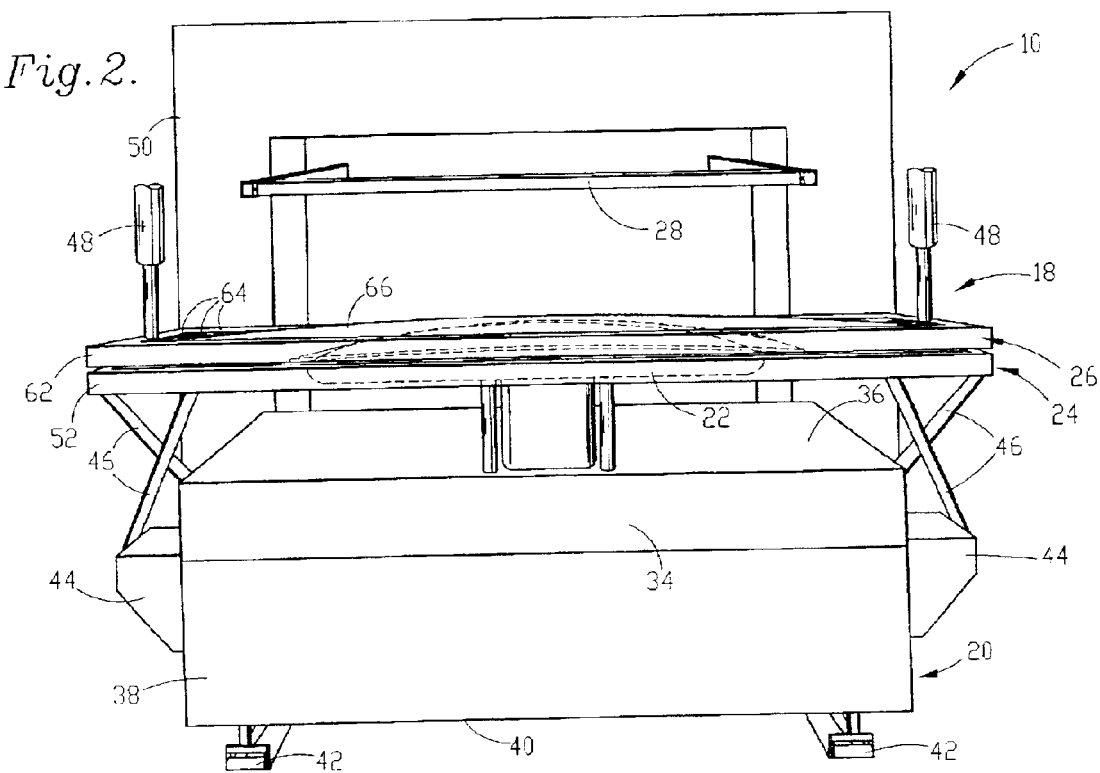
FIG. 2 is a front perspective view of the thermoforming apparatus of FIG. 1 showing the first and second platens lowered over a mold with a polymer sheet therebetween.
Figure 3:
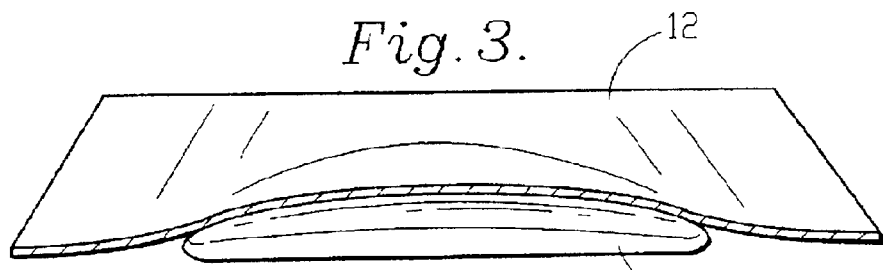
FIG. 3 is a perspective view showing a polymer sheet contacting a mold in a thermoforming process.
Figure 5:
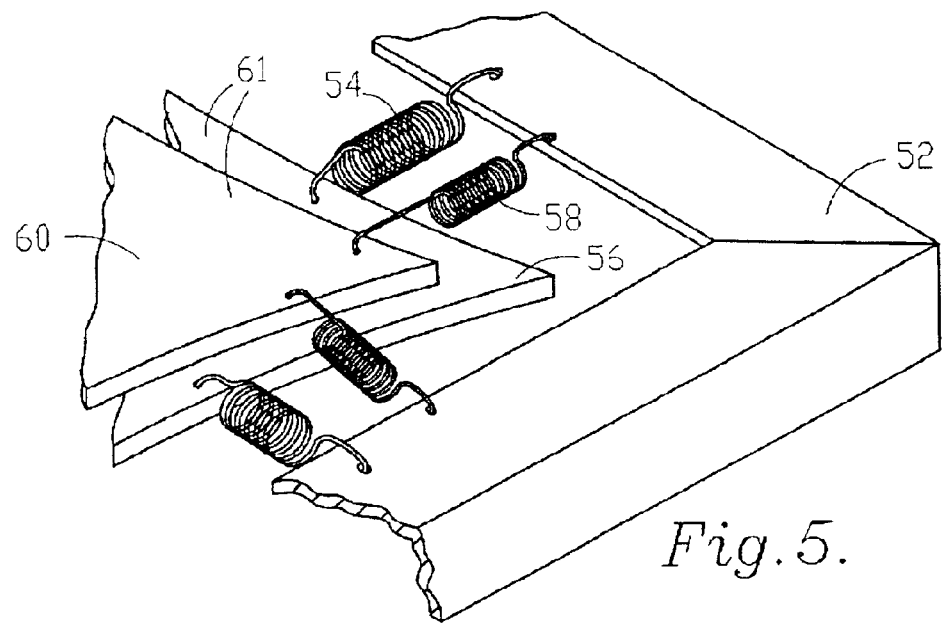
FIG. 5 is a fragmentary perspective view of the lower platen of FIG. 1, showing frame attachment structure.

As best shown in FIGS. 1 and 5, the first platen 24 is of two layer construction, and includes a platen frame 52 coupled with a plurality of felt supporting springs 54 in spaced relationship on the inner periphery thereof, tightly stretching and supporting a layer of industrial wool felt 56. The frame 52 similarly supports a plurality of cotton supporting springs 58 of relatively lighter gauge construction which, in turn, support a layer of cotton 60. In this manner the felt layer 56 and the cotton fabric layer 60 are independently suspended in all directions by the frame 52. The frame 52 is sized to surround the mold 22. The felt and cotton layers 56 and 60 form a flexible web 61 resiliently suspended from the surrounding platen frame 52.

The preferred felt 56 is composed of from about 45% to about 95% wool fibers and has a thickness of from about 1/16 inch to about 1 inch. A particularly preferred composition is S.A.E. F-1, ASTM 16R1 grade having about 95% wool fibers and a thickness of about ⅛ inch, and is obtained from the Booth Felt Company. The preferred cotton fabric 60 is composed of 100% cotton, with a thickness of from about 0.01 inches to about 0.06 inches, with a preferred thickness of about 0.025 inches. The cotton may be of a conventional weave, however, a herringbone weave is particularly preferred because it offers a tight weave which prevents penetration of wool fibers from the felt layer 56 from contacting the masked surface 32 of the substrate sheet 12. Because the felt 56 is of nonwoven construction, it has a greater modulus of elasticity than the cotton 60, and it stretches to a greater extent as the platen 24 is pushed down over the mold 22. The tightly woven cotton 60 serves to prevent the felt 56 from wearing against the surface of the coating 16 as it stretches. Those skilled in the art will appreciate that heavier grades of platen felt 56 and cotton 60 will be employed where the frame 52 is extremely large in order to accommodate a large substrate sheet 12.

As best shown in FIGS. 1 and 4, the second platen 26 is of one layer construction, including a frame 62 coupled with a plurality of cotton supporting springs 64 in spaced relationship on the inner periphery thereof supporting a layer or web of cotton 66.

In a thermoforming process or method of use 68, an operator at step 70 first applies an even coating of a heat resistant non-stick coating 16 to a polymer substrate or sheet 12 laminated with a polymer film 14 to form a heat resistant, shock absorbent masking 33. The coated polymer substrate 12 may be cut into a predetermined shape, using a router or saw (not shown). The operator next positions the coated substrate 2 on the stretched cotton cloth 60, which in turn rests on the tightly stretched felt 56 of the first platen 24 at step 72. At step 74, the heat source 28 is actuated to apply even heat to the coated sheet 12 for a period of from about 4 to about 12 minutes until the lower surface 32 reaches a forming temperature of between about 300° and about 320° F., with a temperature of about 310° F. being preferred, and the upper surface reaches a temperature of between about 300° and about 375° F., with a temperature of about 350° F. being preferred. The lower platen 24 is then lowered at step 76, forming the platen 24 over the surface of the mold 22, as the hot sheet 12 sags and generally conform to the mold 22. When the sheet 12 begins to conform to the mold 22 at step 78, heat source 28 is removed at step 80, and the second platen 26 is lowered over the sheet 12 at step 82 to urge the still hot sheet 12 into complete conformation with the surface of the mold 22. By employing a second platen 26, the operator can remove the heat source 28 while the substrate 12 is at a somewhat lower temperature, and the thermoforming process will be completed by application of mild pressure by the second platen 26.

Thermoforming in this manner at the lower range of formable temperatures produces a finished article having uniform, superior optical clarity. Alternatively, the thermoforming process may be accomplished using a single platen 24. In such instances, it is necessary to apply the coating 16 to only the lower, mold-contacting surface 32 of the substrate 12. The heat source 28 remains in place until the polymer substrate 12 reaches a temperature at the higher end of the range, ensuring that it will remain formable for a sufficient period of time to allow the force of gravity to cause complete conformation of the substrate 12 to the mold 22. Once formed, the sheet 12 is allowed to cool in place for a period of about 1 to about 5 minutes at step 84, with a preferred cooling period of about 2 minutes. A fan (not shown) may then be directed toward the support assembly 20 including the mold 22 and formed sheet 12 for additional cooling. When the formed product reaches a temperature of about 200° or any other temperature permitting comfortable handling, an operator unmolds the thermoformed product at step 86.

The formed product is then moved to a clean, dust free area, preferably a class 1000 clean room where the masking 33 is stripped manually. Advantageously, the heat resistant coating 16 and underlying polymer film 14 which cooperatively form the masking 33 remain intact, with the coating 16 adhering to the masking 14 during removal from the product so that the coating 16 does not flake off and foul the clean room. Further coatings, such as photochromic coatings, tints, antifog and abrasion resistant hard coatings can be easily applied to the clean, dust and abrasion free surface of the formed article without any additional preparation or cleaning.

EXAMPLE I

A polycarbonate sheet was subject to a thermoforming process according to the method of the invention to produce a curved automotive windshield free of surface marking, as follows:

Coating

A sheet 12 of 9030 grade polished Lexan ® polycarbonate produced by General Electric Structural Products, Mt. Vernon, Indiana was employed as a substrate. Both surfaces of the polycarbonate sheet were factory laminated by General Electric with a 0.002 inch thick protective laminate 14 of sign grade adhesive-free polyethylene.

Black Pitt-Therm 97-724, a heat resistant silicone produced by PPG Architectural Finishes, was thinned 5.6:1 by weight with Varnish Makers and Painters Naptha (petroleum spirits) to produce a coating mixture. A 0.002 inch thick coating 16 was applied to both laminated surfaces of the polycarbonate sheet by spraying.

Thermoforming Equipment

A modified model 406XX PVI Thermoformer, produced by Plasti-Vac, Inc. of Charlotte N.C. was used. The machine included an infrared heat source 28 positioned above a mobile support table 34. The table 34 also included a motorized frame for supporting a large, stretched piece of ⅛ inch thick 95% wool F1 grade felt 56, having a thickness 0.125 or ⅛ inches, obtained from Booth Felt. Co., Inc., Chicago, Ill.

Forming Process

A male mold 22 was positioned on the support table 34 beneath the felt platen 24. The precut, coated masked polycarbonate windshield blank 35 was positioned on the cotton surface of the platen 24, directly above the mold 22. The table was moved to a position beneath the heater and the blank 35 was heated for 8 minutes until the bottom surface of the blank 35 reached a forming temperature of 310° F. and the upper surface reached a temperature of 350° F. The platen frame 24 was lowered, forming the platen over the top surface of the mold 22 as the hot blank 35 curved to conform to the shape of the mold. Once formed, the blank 35 was allowed to cool in place for 2 minutes. The table 34 was moved away from the heater and fans were directed toward the formed blank 35 for an additional minute. Following the cooling period, the formed windshield was easily removed from the mold 22.

It is to be understood that while certain forms of the present Invention have been illustrated and described herein, the invention is not to be limited to the specific forms or arrangement of parts described and shown. Having described the preferred embodiments of the present invention, the following is claimed as new and desired to be secured by Letters Patent:

What is claimed is:

1. A method of thermoforming a polymer sheet, comprising the steps of:

positioning a polymer sheet on a stretchable web supported by a platen positioned in spaced relation to a mold;

heating the polymer sheet to a thermoformable temperature; and lowering said platen over said mold to effectively engage said sheet with said mold to thereby enable said polymer sheet to conform to said mold.

2. A method of thermoforming as set forth in claim 1, further including the step of:

coating the polymer sheet with a heat resistant non-stick composition.

3. A method of thermoforming as set forth in claim 2, wherein said polymer sheet further includes a surface protecting laminate.

4. A method of thermoforming as set forth in claim 3, wherein said non-stick coating comprises a solution including a solvating quantity of an organic solvent mixed with a quantity of a polymer selected from the group consisting essentially of silanes, silicones, siloxane, acrylic resins, polytetrafluoroethylene, epoxies, polyesters, urethanes, allyl resins, amino resins, phenolic resins.

5. A method of thermoforming as set forth in claim 3, wherein said non-stick coating comprises a ceramic material.

6. A method of thermoforming as set forth in claim 2, wherein said heat resistant coating composition includes silicon.

7. A method of thermoforming as set forth in claim 1, further including the step of:

after step (c), lowering a second movable platen toward said sheet for urging said sheet in conformance with said mold.

8. A method of thermoforming as set forth in claim 1, further including the steps of:

after step (c), waiting until said polymer sheet conforms to said mold; and removing said formed polymer sheet from the mold.

9. A method of thermoforming a polymer sheet having a surface protecting laminate, comprising the steps of:

coating the polymer sheet with a heat resistant non-stick composition;

positioning the coated polymer sheet on a stretchable web supported by a platen positioned in spaced relation to a mold;

heating the coated polymer sheet to a thermoformable temperature;

lowering said platen over said mold to effectively engage said sheet with said mold to thereby enable said polymer sheet to conform to said mold;

lowering a second stretchable web supported by a platen toward said sheet for urging said sheet into conformance with said mold;

waiting until said polymer sheet conforms to said mold; and removing said formed polymer sheet from said mold.

* * * * *